July 26, 1927.
F. WELLS
CLOTHES PROTECTOR
Filed Oct. 10, 1921
1,636,885
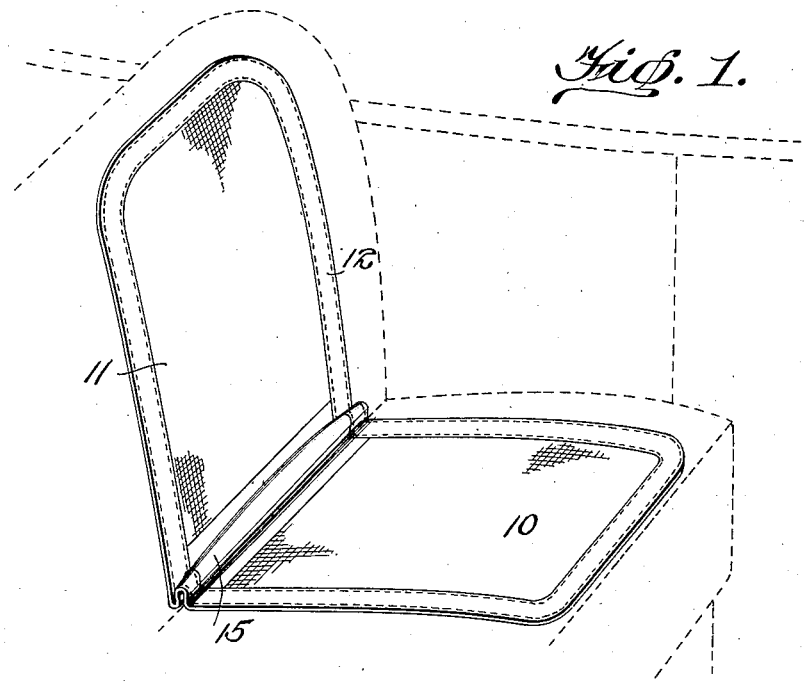
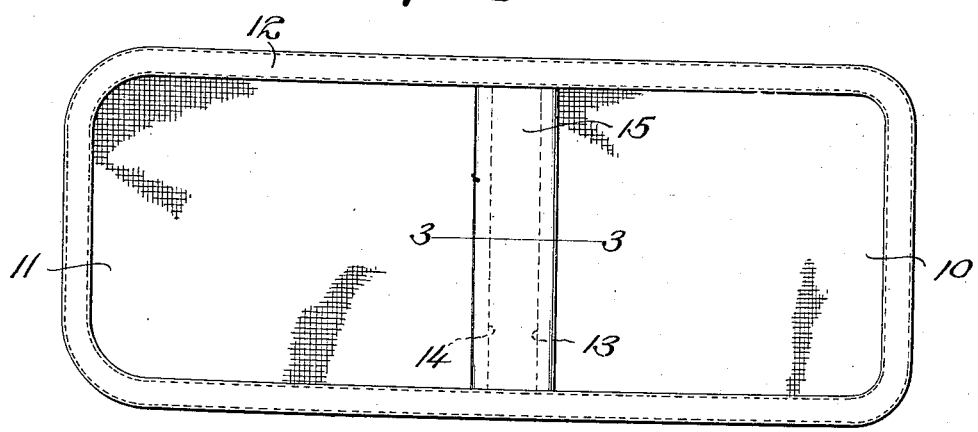
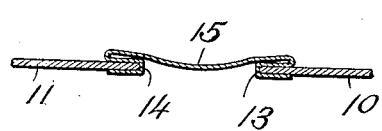
Inventor
Frank Wells,
by Bright & Bailey
Attorneys Patented July 26, 1927.

1,636,885

UNITED STATES PATENT OFFICE.

FRANK WELLS, OF MOBILE, ALABAMA, ASSIGNOR, BY MESNE ASSIGNMENTS, TO EVR KLEAN SEAT PAD CO., OF ST. LOUIS, MISSOURI, A CORPORATION OF MISSOURI.

CLOTHES PROTECTOR.

Application filed October 10, 1921. Serial No. 506,615.

My invention relates to clothes protectors for use in connection with seats, chairs and the like, the same being particularly adapted for use in connection with automobile seats although in no sense restricted to such use.

When a clothes protector comprising hingedly connected seat and back sections is utilized in connection with automobile seats and particularly the driver's seat it is subjected to exceedingly hard usage and strain as a result of the "squirming" or "wriggling" movements of the occupant of the seat while the back section of the protector is held tightly clamped between the back of the occupant and the back of the seat. Under such conditions the sections of the protector are subjected to excessive strain and are soon torn and injured to an extent necessitating replacement thereof with another.

It is therefore the purpose of my present invention to obviate the foregoing undesirable conditions and materially lengthen the life of the protector under hard usage. To this end I form the seat and back sections of the protector of relatively stiff pliable material, such as matting, and connect said sections by a hinge member of greater pliability than the sections and sufficiently extensive to permit restricted bodily movement of the seat section in response to "squirming" and "wriggling" of the occupant of the seat without influence on the back section and without imposing a destructive strain on either or both sections of the protector.

Furthermore, it is the purpose of my present invention to construct the seat and back sections of material, such as matting, which presents a relatively smooth surface adapted to permit movements of the seat occupant relative to the sections and thereby eliminate dragging action on the protector tending to its derangement and injury.

It is also the purpose of my invention to improve the detail construction of devices of this general character; particularly by utilizing the hinge connection between the protector sections to serve also as a protecting binding for the adjacent edges of the sections.

In the drawings chosen to illustrate my invention, the scope whereof is set forth in the appended claims:

Figure 1 is a perspective view showing my invention associated with an automobile seat, the latter being shown somewhat conventionally in dotted lines;

Figure 2, a plan view of my improved clothes protector straightened or flattened out; and Figure 3, a section on the line 3—3 of Fig. 2.

Referring to the drawings my improved clothes protector is shown as comprising sections 10 and 11 constituting the seat and back of the protector. If desirable the sections can be constructed of such relative size as to be interchangeably used for the back or seat, or one section may be constructed longer than the other to permanently constitute the back, while the other permanently constitutes the seat. In the present instance the section 10 constitutes the seat and section 11, which is the longer, the back. The sections 10 and 11 are constructed of relatively stiff pliable material, preferably matting as this particular material, owing to its smooth surface, possesses another advantage when used in devices of this character as will hereinafter appear. An edge protecting binding 12 is carried by the sections 10 and 11 and connects the latter together with their opposite adjacent edges 13 and 14 in spaced relation. The edges 13 and 14 between the connecting portions of the binding 12 are in turn connected by a hinge member 15 of material having greater pliability than the sections 10 and 11, preferably cloth fabric, and, as will be observed, this member 15 is sufficiently extensive to permit restricted bodily movement of the section 10 in response to "squirming" and "wriggling" of the seat occupant without influence on the section 11 and without imposing a destructive strain on either or both sections of the protector. It will also be observed that the ends of the member 15 are arranged around the edges 13 and 14 of the sections so as to constitute a binding therefor as clearly shown in Fig. 3, thus imparting a double function to the hinge member.

It will also be observed that the protector can be reversed to afford double wear and furthermore, owing to the smooth surface of matting material of which the sections 10 and 11 are constructed easy movement of the seat occupant relative to the sections will be possible without imposing any dragging action on the protector tending to its displacement and injury.

I claim:—

1. A clothes protector for seats, chairs and the like comprising seat and back sections each of which is composed of a single sheet of relatively stiff pliable material, edge protecting binding enclosing the lateral side and outer end edges of said sections and connecting said sections together at their lateral side edges only in the relationship in which said seat and back sections are spaced relatively a considerable distance apart, and a cloth fabric hinge member enclosing the adjacent edges of said sections.

2. A clothes protector for seats, chairs and the like comprising seat and back sections each of which is composed of a single sheet of relatively stiff pliable material, edge protecting binding enclosing the lateral side and outer end edges of said sections and connecting said sections together at their lateral side edges only in the relationship in which said seat and back sections are spaced relatively a considerable distance apart, and a wide fabric hinge having greater pliability than said sections and enclosing the adjacent edges of said sections.

In testimony whereof I hereunto affix my signature.

FRANK WELLS.